United States Patent [19]
Vacval et al.

[11] 4,117,911
[45] Oct. 3, 1978

[54] TORQUE BARS FOR SLIDING CALIPER DISC BRAKE

[75] Inventors: Dusan M. Vacval, Cicero; E. A. Domes, Carpentersville, both of Ill.

[73] Assignee: International Harvester Company, Chicago, Ill.

[21] Appl. No.: 820,519

[22] Filed: Aug. 1, 1977

[51] Int. Cl.² .................................. F16D 65/02
[52] U.S. Cl. ...................... 188/73.3; 188/18 A
[58] Field of Search .................. 188/18 A, 72.4, 73.3, 188/71.1, 205 R, 206 R, 370, 72.5, 73.6

[56] References Cited

U.S. PATENT DOCUMENTS

| 2,351,041 | 6/1944 | Hawley | 188/72.4 |
| 3,677,372 | 7/1972 | Burnett | 188/73.3 |
| 3,862,674 | 1/1975 | Vananrooy et al. | 188/73.6 |
| 3,999,635 | 12/1976 | Hotchkiss | 188/72.5 |
| 4,004,658 | 1/1977 | Margetts et al. | 188/72.4 |

FOREIGN PATENT DOCUMENTS

| 390,068 | 7/1965 | Switzerland | 188/73.3 |
| 807,263 | 1/1959 | United Kingdom | 188/18 A |

*Primary Examiner*—Edward R. Kazenske
*Attorney, Agent, or Firm*—Douglas W. Rudy; Ronald C. Kamp; F. David AuBuchon

[57] ABSTRACT

Disc brake sliding caliper retention is provided by a pair of torque bars fixedly mounted to a non-rotating member adjacent a rotating disc member. The torque bar pair constrains at least one sliding caliper from rotation with the disc when the caliper clamps down on the disc but allows axially movement relative to the rotational axis of the disc. The torque bars are mounted to the non-rotating member such that caliper forces resulting from engagement with the disc are perpendicular to the torque bars thus eliminating turning or shifting of the torque bars.

9 Claims, 4 Drawing Figures

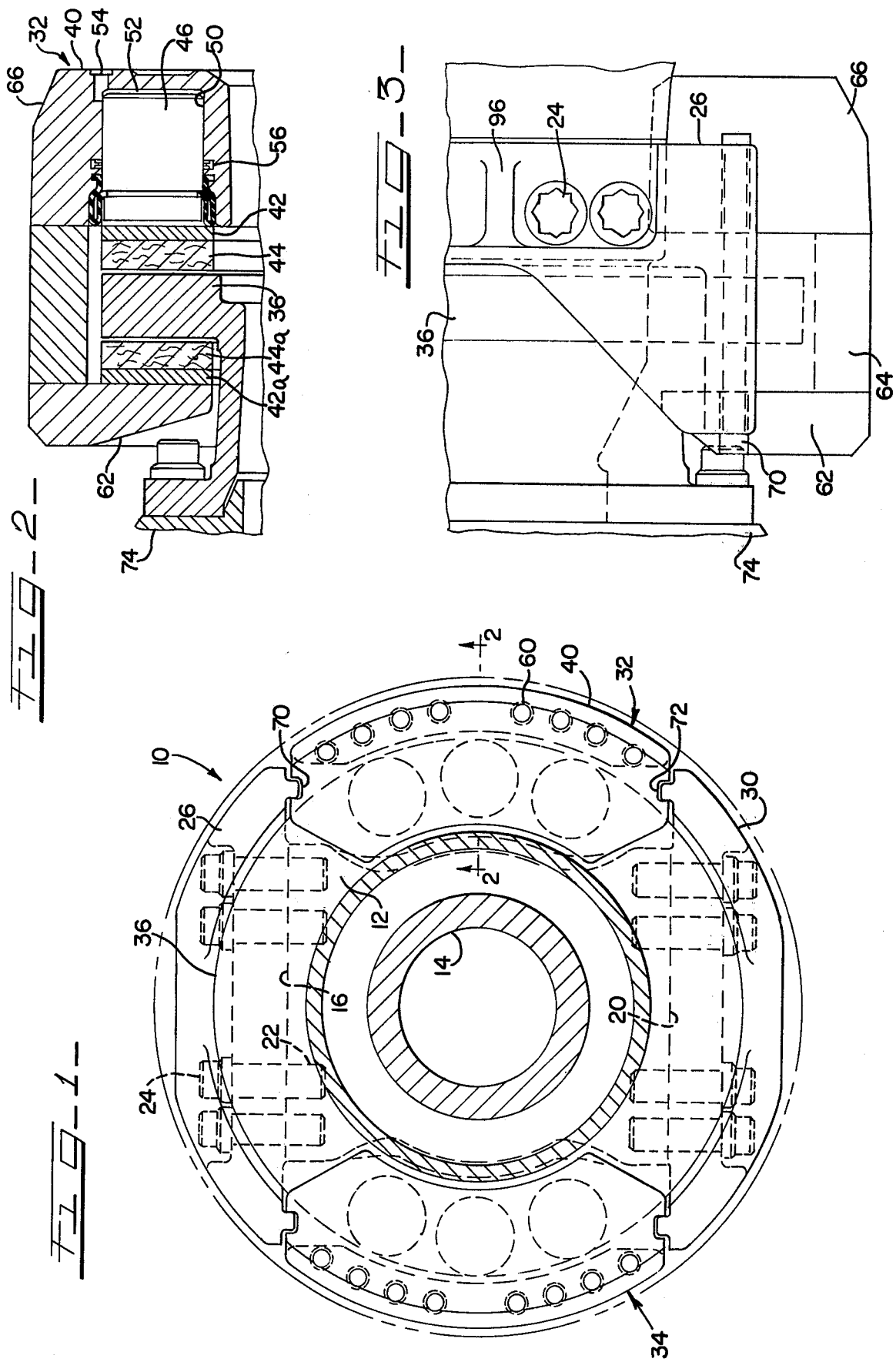

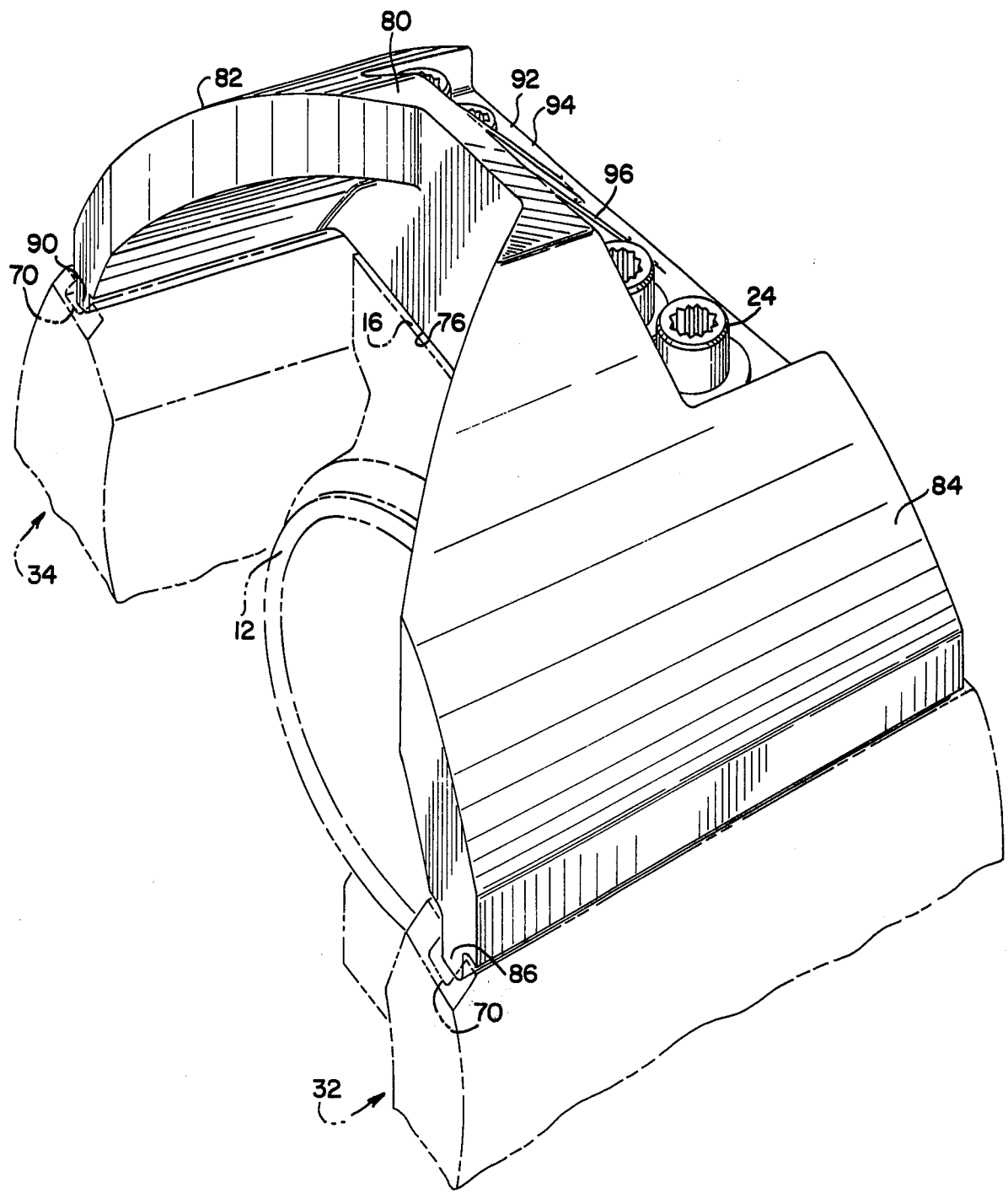

TORQUE BARS FOR SLIDING CALIPER DISC BRAKE

BACKGROUND OF THE INVENTION

1. Field of the Invention

Disc brake system torque bars for locating a sliding caliper and a lining carrier used to retard motion of a rotating disc, the caliper capable of travel parallel to the axis of rotation. Each of a pair of torque bars for locating the sliding calipers and the lining carriers have parallel mounting surfaces. This permits transmission of caliper forces perpendicular to the torque bars thus eliminating turning and shifting of the torque bars.

2. Description of the Prior Art

In heavy duty disc brake systems it is common to use torque bars which are bolted or otherwise integral with axle housing castings to locate sliding calipers and lining carriers in proximity to the disc brake rotor. Torque bars allow lateral movement of the calipers and the carriers relative to runout of the rotor.

A typical contemporary structure is shown in U.S. Pat. No. 3,999,635 to Hotchkiss, however this patent is deficient in that it does not provide the integrity of the instant invention. Hotchkiss's use of four torque bars bolted to the inclined torque bar mounting pads may allow turning and shifting of the torque bars around their major axis resulting from extreme braking torque loads.

SUMMARY OF THE INVENTION

The invention provides a pair of torque bars for use on a single wheel disc brake for locating a pair of floating calipers and lining carriers. Each torque bar supports one end of each floating caliper. A single wheel brake system will use two torque bars and two sliding calipers per wheel. Flat surfaces herein "torque bar receiving pads" are provided on an axle housing diametrically opposite each other to accommodate flat base surfaces of the torque bars.

As a result of the torque bar being mounted to the axle housing on parallel torque bar receiving pads the braking torque is transmitted perpendicularly from the floating caliper lining carriers to the torque bar. The cap screw fasteners maintaining the torque bars to the axle housing are consequently subjected to stress forces rather than shear forces.

Another advantage is that the torque bars reduce the cost of axle housing machining as the parallel torque bar receiving pads are easier to machine and hold to relative angular tolerances than the inclined torque bar receiving pads of the prior art. Furthermore the number of torque bars needed is half of what is needed by prior art devices of similar torque capability and design.

BRIEF DESCRIPTION OF THE DRAWINGS

FIG. 1 presents a side elevation view of a disc brake system carried on partially sectioned axle carrier.

FIG. 2 is a section view taken through plane 2—2 of FIG. 1.

FIG. 3 is a top view of a portion of the brake disc system.

FIG. 4 is a perspective view showing the torque bar in its entirety.

DETAILED DESCRIPTION OF THE INVENTION

The instant invention is clearly shown in the drawing figures. The overall association of the elments of the structure can be gleaned from FIG. 1 which shows a floating caliper disc brake assembly generally 10 with hidden components represented by interrupted lines including an axle housing 12, having an axial center point 18, adapted to support an axle 14 in a bearing (not shown). The axle housing 12 has first 16 and second 20 torque bar receiving pads machined or otherwise formed diametrically opposite each other as shown. The surfaces of these torque bar receiving pads are generally flat or smooth and are parallel to each other. Each pad is equipped with threaded bores or alternatively blind bores, one shown as 22, that may receive bolts or cap screws 24 which fasten the first and second torque bars, 26 and 30, to the axle housing 12. In the embodiment shown four cap screws are used to attach each torque bar to the axle housing. Floating calipers generally 32 and 34 are located diametrically opposite each other to straddle a disc or rotor 36 which is bolted to a rotating member such as 74. (See FIGS. 1, 2, 3). Each caliper is of a conventional design and includes a housing 40 and 40a containing lining carriers 42 and 42a to which a plurality of friction pads 44 and 44a have been bonded or alternatively fastened. A brake piston 46 may be urged laterally in bore 50 as a result of fluid pressure in chamber 52 via the supply passage 54. Seal 56 prevents leakage around the piston. Each caliper will have at least one brake piston and at least a single friction pad. Fasteners, one represented as 60 hold the inboard caliper component 62 and the spacer 64 integral with the caliper piston component 66, the entire assembly previously referred to as housing 40. First and second retaining channels or keyways 70 and 72 are formed in each floating caliper. As seen in FIG. 3, the keyway 70 traverses completely across the inboard caliper component 62 and partially across the caliper piston component 66. The lining carriers 42 and 42a are provided with keyways which are dimensionly narrower than the keyways 70 and 72 in the floating caliper. This dimensional relationship assures that brake torque is applied to the lining carrier rather than the caliper housing.

FIG. 4 is a perspective presentation showing the torque bar which is the crux of this invention. The torque bar is shown in a typical embodiment while the axle housing 12 and the floating calipers 32 and 34 are presented as simplified broken line components for the sake of clarity. The torque bar has a base portion of generally rectangular shape having two sides longer than the two ends. The flat side of the base that is normally mounted adjacent the torque bar mounting pads is termed the inboard side while the surface 94 is termed the outboard surface. The torque bar 26 is formed with the flat mounting surface 76 on the inboard side thereof, that is adjacent the torque bar receiving pad 16 upon tightening of cap screws 24. A vertical support 80 extending upwardly from the outboard surface, merges with first and second arcuate members 82 and 84 which serve to locate the floating calipers. Each arcuate member has an upper portion simultaneously attached to the ends of the base portion and to the vertical support 80. The extremity of the lower portion of each arcuate member is provided with a key 86 and 90 respectively projecting perpendicularly outward from and extending longitudinally along the lower portions of the arcuate members which interacts with the retaining channel or keyway portions 70 of each caliper. This key and keyway arrangement allows the floating caliber to move laterally with respect to the axle. A fastener accommodating cavity 92 is provided to accommodate the cap screws. The bottom 94 of this cavity is relatively parallel to the flat mounting surface 76. The thickness of the torque bar between cavity bottom 94 and flat mounting surface 76 is substantial. This section is the base portion previously referred to. A pair of gussets, one shown as 96 in FIGS. 3 and 4, are provided to further integrity between the cavity bottom 94 and the vertical support 80. Each gusset is generally of triangular shape having one edge adjacent to and affixed to the vertical support 80 and a second edge adjacent to and affixed to the outboard surface of the cavity bottom 94 or the outboard surface of said flat base portion. With this arrangement the caliper forces upon braking are perpendicular to the torque bars thus preventing a shifting or turning of the torque bars. Both torque bars are identical; therefor, there is no need for right or left side torque bars as is necessary in some prior art devices. The torque bars are interchangeable.

It should be apparent from the drawing figures that the effectiveness of the torque bars is not dependent on the direction of axle rotation or vehicle direction. The instant structure provides equal torque transfer upon braking in either forward or reverse vehicle direction.

Thus there has been provided a floating caliper retention means for use in a disc brake that fully satisfies the objects and advantages as set forth above. While the invention has been described in conjunction with specific embodiments thereof it is evident that several variations on this theme will be apparent to those skilled in the art in light of this disclosure. The spirit and broad scope of appended claims intend to embrace such variations.

What is claimed is:

1. A floating caliper disc brake assembly comprising:
   an axle housing having an axial center point, said axle housing having a pair of torque bar receiving pads provided thereon, each of said torque bar receiving pads being a flat surface having a plurality of threaded bores and formed on said axle housing, each of said torque bar receiving pads located on opposite sides of said axial center point of said axle housing such that said flat surfaces of said torque bar receiving pads are parallel to each other;
   a pair of torque bars having flat mounting surfaces on the inboard side thereof, one of said pair of torque bars being mounted on one of said torque bar receiving pads and the other of said pair of torque bars being mounted on the other of said torque bar receiving pads, each of said torque bars having a plurality of apertures through said mounting surface, said mounting surface dimensions being similar to said flat surface of said torque bar receiving pad, each of said torque bars having first and second arcuate members on each end thereof connected by a vertical support, each arcuate member having a key at the extremity thereof, said keys projecting perpendicularly outward from said inboard side of said torque bar;
   a pair of floating calipers located between said pair of torque bars, each floating caliper having a keyway at each end thereof dimensionally compatible with said keys in said torque bars, the keyways on one of said floating calipers respectively engaging the keys on the first arcuate member of each said torque bar and the keyways on the other of said floating calipers respectively engaging the keys on the second arcuate member of each said torque bar such that said floating calipers are maintained in position between said pair of torque bars and are free to move laterally relative to said keys of said torque bars;
   a plurality of threaded fasteners passing through said plurality of said apertures of said torque bars and into said plurality of threaded bores of said torque bar receiving pads to attach said torque bars to said torque bar receiving pads.

2. The invention in accordance with claim 1 wherein said threaded bores in said flat surface of said torque bar receiving pads are blind threaded bores.

3. The invention in accordance with claim 1 wherein each of said torque bars is provided with a fastener accommodating cavity having a bottom spaced apart from and relatively parallel to said flat mounting surface of said torque bar.

4. The invention in accordance with claim 3 wherein each of said torque bars are provided with a pair of gussets extending from said vertical support to said bottom of said fastener accommodating cavity.

5. The invention in accordance with claim 1 wherein each of said pair of torque bars are identical such that torque bar interchangeability between each of said torque bar receiving pads is possible.

6. The invention in accordance with claim 1 wherein each torque bar receiving pad of said pair is located 180° away from the other torque bar receiving pad of said pair.

7. A torque bar for use in maintaining a floating caliper properly located on an axle assembly including an axle and a brake disc mounted to the axle, said torque bar comprising:
   a flat base portion of a generally rectangular shape having two sides longer than two ends and having an inboard surface and an outboard surface, said inboard surface being a smooth flat surface;
   a vertical support extending upwardly from said outboard surface of said flat base portion;
   a first arcuate member having an upper portion thereof simultaneously attached to a first end of said rectangular shaped flat base portion and to said vertical support, said arcuate member having a lower portion including a key extending longitudinally along the lower portion of said first arcuate member perpendicular to said inboard surface;
   a second arcuate member having an upper portion thereof simultaneously attached to a second end of said rectangular shaped flat base portion and to said vertical support, said second arcuate member having a lower portion including a key extending longitudinally along the lower portion of said second arcuate member perpendicular to said inboard surface.

8. The invention in accordance with claim 7 wherein said flat base portion defines a plurality of apertures therethrough.

9. The invention in accordance with claim 7 wherein said torque bar further comprises one or more gussets of generally triangular shape having one edge adjacent to and affixed to said vertical support and a second edge adjacent to and affixed to said outboard surface of said flat base portion.

* * * * *